(12) United States Patent
Kondoh

(10) Patent No.: US 11,113,011 B2
(45) Date of Patent: Sep. 7, 2021

(54) INFORMATION PROCESSING SYSTEM, INFORMATION PROCESSING METHOD, AND RECORDING MEDIUM

(71) Applicant: Naritake Kondoh, Kanagawa (JP)

(72) Inventor: Naritake Kondoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/743,149

(22) Filed: Jan. 15, 2020

(65) Prior Publication Data

US 2020/0241807 A1 Jul. 30, 2020

(30) Foreign Application Priority Data

Jan. 28, 2019 (JP) .............................. JP2019-012406

(51) Int. Cl.
*G06F 3/12* (2006.01)
*G06F 9/46* (2006.01)

(52) U.S. Cl.
CPC ............ *G06F 3/121* (2013.01); *G06F 3/1267* (2013.01); *G06F 3/1287* (2013.01); *G06F 9/461* (2013.01)

(58) Field of Classification Search
None
See application file for complete search history.

(56) References Cited

U.S. PATENT DOCUMENTS

| | | | |
|---|---|---|---|
| 2012/0300268 A1 | 11/2012 | Oseto et al. | |
| 2013/0107309 A1 | 5/2013 | Kondoh | |
| 2013/0194633 A1 | 8/2013 | Takatsu et al. | |
| 2013/0208292 A1* | 8/2013 | Akari | G06F 3/121 358/1.13 |
| 2014/0068715 A1 | 3/2014 | Kondoh | |
| 2014/0232529 A1 | 8/2014 | Oseto et al. | |
| 2015/0029535 A1 | 1/2015 | Kondoh et al. | |
| 2015/0029536 A1 | 1/2015 | Suzuki et al. | |
| 2015/0036167 A1 | 2/2015 | Naitoh et al. | |

(Continued)

FOREIGN PATENT DOCUMENTS

| | | |
|---|---|---|
| EP | 2602988 | 6/2013 |
| JP | 2003-229960 | 8/2003 |
| JP | 2015-069625 | 4/2015 |

OTHER PUBLICATIONS

Extended European Search Report dated Jun. 22, 2020.

*Primary Examiner* — Frantz Bataille
(74) *Attorney, Agent, or Firm* — Harness, Dickey & Pierce, P.L.C.

(57) ABSTRACT

An information processing system for providing a service via a service providing server residing on a first network, the service being requested by an information processing apparatus residing on a second network different from the first network based on application information, the information processing system including: first circuitry to obtain state information indicating a state of the service providing server; and second circuitry to transmit the state information of the service providing server to the information processing apparatus in response to reception of a service request to the service providing server from the information processing apparatus, to cause the information processing apparatus to perform a notification operation according to the state information that is received.

10 Claims, 20 Drawing Sheets

(56) References Cited

U.S. PATENT DOCUMENTS

| | | | |
|---|---|---|---|
| 2015/0092232 A1* | 4/2015 | Kyoo | H04L 67/26 358/1.15 |
| 2015/0281475 A1* | 10/2015 | Nagasaki | H04N 1/00244 358/1.13 |
| 2015/0370847 A1 | 12/2015 | Kondoh et al. | |
| 2017/0070640 A1 | 3/2017 | Kondoh | |
| 2017/0272587 A1 | 9/2017 | Kondoh | |
| 2018/0095951 A1* | 4/2018 | Takamiya | G06K 9/6842 |

\* cited by examiner

FIG. 3

```
<DATA DEFINITION>
[
    {
        "data_id" : 1,
        "data_key" : "storage_filename",
        "format" : "input_text",
        "data_source" : null
    },
    {
        "data_id" : 2,
        "data_key" : "storage_targetfolder",
        "format" : "select",
        "data_source" : http://sample.AAA.xxx/service-a/fol  ders
    }
]
```

FIG. 4

```
<LAYOUT>
[
    {
        "data_id" : 1,
        "display_name" : "FILE NAME",
        "layout" : [
            "order" : 1
        ]
    },
    {
        "data_id" : 2,
        "display_name" : "DELIVERY DESTINATION",
        "layout" : [
            "order" : 2
        ]
    }
]
```

FIG. 5

```
<PROCESSING>
From("file : input")
.to("process : ocr")
.to("storage : send_to_folder ? type=service-a & target=samplefolder")
```

FIG. 6

FILE PROCESSOR
COMMON I/F
   /service-a/process/file
UNIQUE I/F */extension FOLLOWED BY
   /service-a/process/extension/attach

FIG. 7

DATA PROCESSOR
COMMON I/F
   /service-a/data/files
   /service-a/data/folders
UNIQUE I/F */extension FOLLOWED BY
   /service-a/data/extension/images

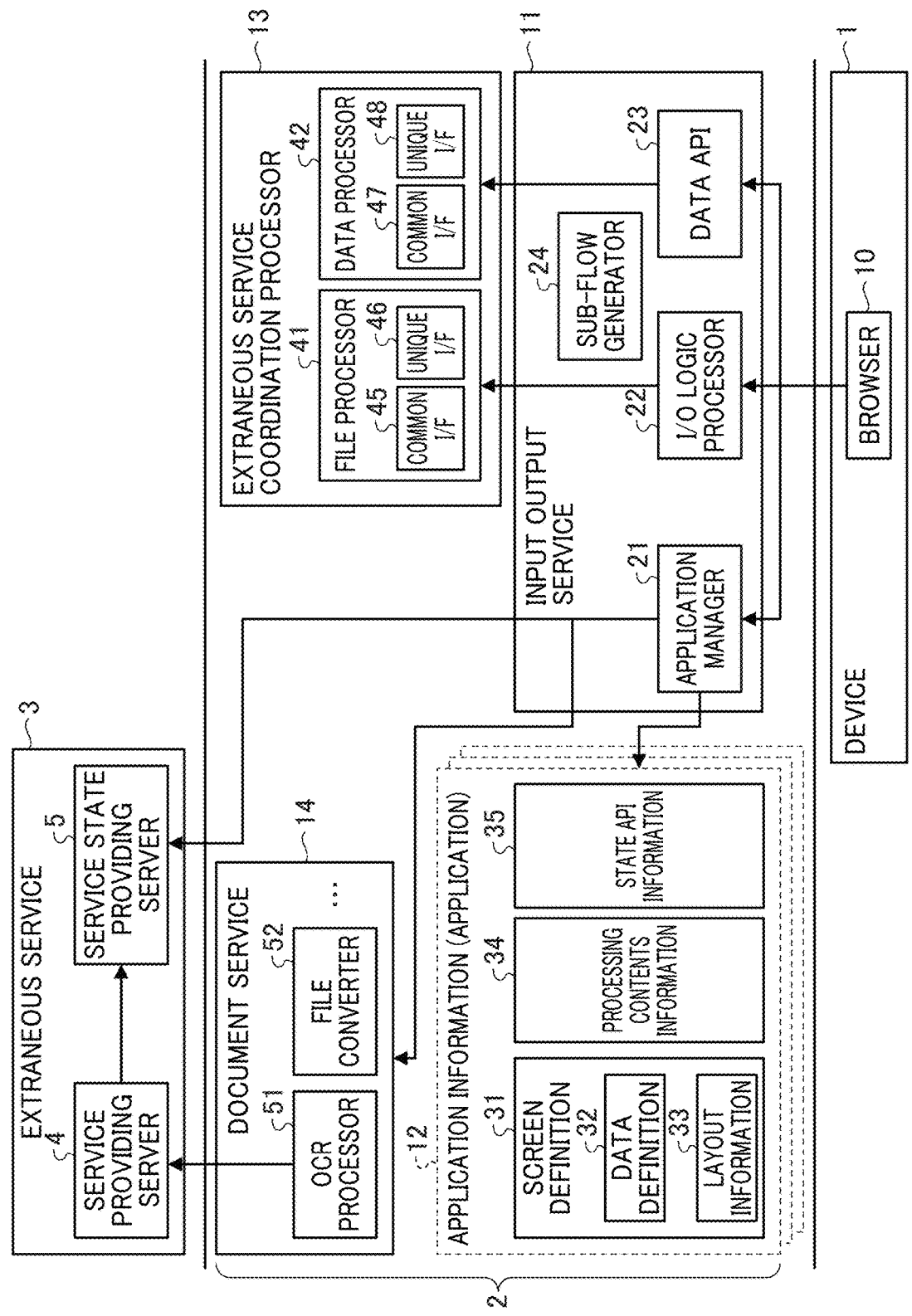

WORKFLOW APPLICATION SETTING (1) SELECT TYPE→ (2) BASIC SETTING→ (3) DETAILED SETTING→ (4) REGISTER

| | |
|---:|---|
| TYPE | SCAN TO FLOW |
| LANGUAGE AVAILABLE | ENGLISH |

SET A LANGUAGE AVAILABLE ON THE WORKFLOW APPLICATION SCREEN TO BE CREATED (A PLURALITY OF CHOICES ALLOWED)

DISPLAY NAME: nanana05

SET A TITLE OF THE SCREEN TO BE DISPLAYED FOR THE USER (MAXIMUM 32 LETTERS)

USER AUTHENTICATION
○ EXIST
◉ NOT-EXIST

IN A CASE WHERE USER AUTHENTICATION EXISTS, USER LOG-IN IS NECESSARY AT THE TIME OF UTILIZING THE WORKFLOW APPLICATION.

ADVANCED SETTING: WHERE TO ACQUIRE A STATUS FROM ︿

AN INQUIRY FOR THE STATUS TO BE DISPLAYED ON THE WORKFLOW APPLICATION IS PROVIDED TO THE SET URL

[BACK] [NEXT] [UPDATE] [CANCEL]

FIG. 11

```
[
  {
    "displayName": "ScanToExtStorage",
    "description": null,
    "tags": null,
    "contents": {
      "applicationView": {
        "type": "scan",
        "displayName": {
          "en": "ScanToExternalStorage"
        },
        "description": null,
        "execEnv": "cloud",
        "loginType": "user",
        "status": "change_published",
        "extStatusUrl":"https://xxxxx/service/status",
        //···PARTIALLY OMITTED···

"views": [
        //···INFORMATION TO BE DISPLAYED··PARTIALLY OMITTED
          {
            "flowName": "ScanToGoogle",
            "defaultParameters": [
              .....
            ],
            "userInputParameters": [
            //····
            ]
          //····
          }
        ],
        "defaultScannerSettings": [
        //···
        ],
        //···
      },
      "flows": [
        {
          //DETAILED PROCESSING
        }
      ]
    }
  }
]
```

```
GET: /service/status
{
    "message": "The service is currently stopped.\nThe recovery plan is tomorrow 09:00."
}
```

FIG. 14

```
GET: /service/status
{
  "message": [
    {"ja": "現在サービス停止中です。¥n復旧予定は明日09:00です。"},
    {"en": "The service is currently stopped. ¥n The recovery plan is tomorrow 09:00."},
  ]
}
```

FIG. 15

```
GET: /service/status
{
  "state": "error",
  "message": [
    {"ja": "現在サービス停止中です。¥n復旧予定は明日09:00です。"},
    {"en": "The service is currently stopped. ¥n The recovery plan is tomorrow 09:00."},
  ]
}
```

FIG. 18

| id | statusUrl | File | param | expiredate |
|---|---|---|---|---|
| 1 | https://xxxxxxxx/service/status | https://tempstrage/1111111 | ..... | 2018/12/12 16:49:00 |
| 2 | https://yyyyyyyy/service/status | https://tempstrage/2222222 | ..... | 2018/12/12 16:57:31 |
| 3 | https://xxxxxxxx/service/status | https://tempstrage/3333333 | ..... | 2018/12/12 17:32:00 |
| 4 | https://zzzzzzzz/service/status | https://tempstrage/4444444 | ..... | 2018/12/13 14:29:02 |
| 5 | https://xxxxxxxx/service/status | https://tempstrage/4444444 | ..... | 2018/12/15 13:49:00 |

FIG. 19

```
{
    "parameters": [
        "operation1": {
            "serviceKey": [
                "xxxx"
            ],
            "tenantId": "tenantA",
            "userId": "user1",
            "authPriority": null,
            "refresh": null,
            "option": null,
            "_responseSelfErrorMsg": null,
            "_save": false,
            "_skip": false,
            "_skipAll": false,
            "_clearInputFiles": true
        },
        "operation2": {
            "filename": "file1.pdf",
            "folderId": "root",
            "folderPath": null,
            "fields": null,
            "metadata": null,
            "stopWithError": true,
            "continueErrorList": null,
            "accessToken": null,
            "_responseSelfErrorMsg": null,
            "_save": false,
            "_skip": false,
            "_skipAll": false,
            "_clearInputFiles": true
        }
    ],
    "sync": true,
    "validityPeriodSeconds": 3600,
    "secret": null
}
```

WORKFLOW APPLICATION SETTING

(1) SELECT TYPE→ (2) BASIC SETTING→ (3) DETAILED SETTING→ (4) REGISTER

| | |
|---:|---|
| TYPE | SCAN TO FLOW |
| LANGUAGE AVAILABLE | ENGLISH |

SET LANGUAGE AVAILABLE ON THE WORKFLOW APPLICATION SCREEN TO BE CREATED (A PLURALITY OF CHOICES ALLOWED)

| | |
|---:|---|
| DISPLAY NAME | nanana05 |

SET TITLE OF THE SCREEN TO BE DISPLAYED FOR THE USER (MAXIMUM 32 LETTERS)

USER AUTHENTICATION
○ EXIST
● NOT-EXIST

IN A CASE WHERE USER AUTHENTICATION EXISTS, USER LOG-IN IS NECESSARY AT THE TIME OF UTILIZING THE WORKFLOW APPLICATION.

ADVANCED SETTING

[WHERE TO ACQUIRE STATUS FROM ︿]

[                                    ]

AN INQUIRY FOR THE STATUS TO BE DISPLAYED ON THE WORKFLOW APPLICATION IS PROVIDED TO THE SET URL
☐ ENABLE SCHEDULED EXECUTION AT THE TIME OF ERROR

[BACK] [NEXT] [UPDATE] [CANCEL]

FIG. 21

```
[
  {
    "displayName": "ScanToExtStorage",
    "description": null,
    "tags": null,
    "contents": {
      "applicationView": {
        "type": "scan",
        "displayName": {
          "en": "ScanToExternalStorage"
        },
        "description": null,
        "execEnv": "cloud",
        "loginType": "user",
        "status": "change_published",
        "extStatusUrl":"https://xxxxx/service/status",
        "enableScheduleExec":true,
        //···PARTIALLY OMITTED···

"views": [
        //···INFORMATION TO BE DISPLAYED··PARTIALLY OMITTED
          {
            "flowName": "ScanToGoogle",
            "defaultParameters": {
              ·····
            },
            "userInputParameters": {
            //····
            }
          //····
          }
        ],
        "defaultScannerSettings": {
        //···
        },
        //···
      },
      "flows": [
        {
          //DETAILED PROCESSING
        }
      ]
    }
  }
]
```

WORKFLOW APPLICATION SETTING

(1) SELECT TYPE→ (2) BASIC SETTING→ (3) DETAILED SETTING→ (4) REGISTER

| | |
|---|---|
| TYPE | SCAN TO FLOW |
| LANGUAGE AVAILABLE | ENGLISH |

SET LANGUAGE AVAILABLE ON THE WORKFLOW APPLICATION SCREEN TO BE CREATED (A PLURALITY OF CHOICES ALLOWED)

DISPLAY NAME: nanana05

SET A TITLE OF THE SCREEN TO BE DISPLAYED FOR THE USER (MAXIMUM 32 LETTERS)

USER AUTHENTICATION
○ EXIST
● NOT-EXIST

IN A CASE WHERE USER AUTHENTICATION EXISTS, USER LOG-IN IS NECESSARY AT THE TIME OF UTILIZING THE WORKFLOW APPLICATION.

ADVANCED SETTING: WHERE TO ACQUIRE STATUS FROM

AN INQUIRY FOR THE STATUS TO BE DISPLAYED ON THE WORKFLOW APPLICATION IS PROVIDED TO THE SET URL
☐ ENABLE FORCED EXECUTION AT THE TIME OF ERROR

[BACK] [NEXT] [UPDATE] [CANCEL]

FIG. 24

```
[
  {
    "displayName": "ScanToExtStorage",
    "description": null,
    "tags": null,
    "contents": {
      "applicationView": {
        "type": "scan",
        "displayName": {
          "en": "ScanToExternalStorage"
        },
        "description": null,
        "execEnv": "cloud",
        "loginType": "user",
        "status": "change_published",
        "extStatusUrl":"https://xxxxx/service/status",
        "enableForceExec":true,
        //···PARTIALLY OMITTED···

"views": [
        //···INFORMATION TO BE DISPLAYED··PARTIALLY OMITTED
          {
            "flowName": "ScanToGoogle",
            "defaultParameters": {
              .....
            },
            "userInputParameters": {
              //····
            }
          //····
          }
        ],
        "defaultScannerSettings": {
          //···
        },
        //···
      },
      "flows": [
        {
          //DETAILED PROCESSING
        }
      ]
    }
  }
]
```

INFORMATION PROCESSING SYSTEM, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2019-012406, filed on Jan. 28, 2019, in the Japan Patent Office, the entire disclosure of which is hereby incorporated by reference herein.

BACKGROUND

Technical Field

The present invention relates to an information processing system, an information processing method, and a recording medium.

Description of the Related Art

The known information processing system utilizes a service on the Internet (cloud service), to provide such service on the Internet to an image forming apparatus such as a multi-function peripheral (MFP) on an in-house network. For example, a scanned document obtained by the image forming apparatus may be uploaded to a server on the Internet. Furthermore, a document stored in a server on the Internet may be designated for printing.

However, such service on the Internet is provided by a network other than such in-house network. Therefore, the service on the Internet may not be available to a user, for example, when the service is stopped.

SUMMARY

Example embodiments include an information processing system for providing a service via a service providing server residing on a first network, the service being requested by an information processing apparatus residing on a second network different from the first network based on application information, the information processing system including: first circuitry to obtain state information indicating a state of the service providing server; and second circuitry to transmit the state information of the service providing server to the information processing apparatus in response to reception of a service request to the service providing server from the information processing apparatus, to cause the information processing apparatus to perform a notification operation according to the state information that is received.

Example embodiments include an information processing method performed by the information processing system, and a control program for causing the information processing system to perform the information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 3 is a diagram illustrating an example of a data definition of application information;

FIG. 4 is a diagram illustrating an example of layout information of application information;

FIG. 5 is a diagram illustrating an example of a processing order of processing contents information of application information;

FIG. 6 is a diagram illustrating an example of a common interface (I/F) and a unique I/F of a file processor;

FIG. 7 is a diagram illustrating an example of a common I/F and a unique I/F of a data processor;

FIG. 8 is a diagram illustrating how an optical character recognition (OCR) service is provided by a service providing server of an extraneous service and an OCR processor of a document service in the information processing system according to the first embodiment;

FIG. 10 is a diagram illustrating an example of a workflow application setting screen;

FIG. 11 is a diagram illustrating an example of application information;

FIG. 14 is a diagram illustrating an example in which a service state providing server returns a message in Japanese and in English to an application manager, according to a second embodiment;

FIG. 15 is a diagram illustrating a description example of status information of a service providing server, according to a third embodiment;

FIG. 18 is a diagram illustrating a list of temporarily stored jobs, according to a fourth embodiment;

FIG. 19 is a diagram illustrating an example of parameters for a temporarily stored job, according to the fourth embodiment;

FIG. 20 is a diagram illustrating a checkbox displayed on a workflow application setting screen of the information processing system according to a fifth embodiment for designating (selecting) whether or not to enable scheduled execution of an application at the time of an error;

FIG. 21 is a diagram illustrating an example of application information of the information processing system according to the fifth embodiment;

FIG. 23 is a diagram illustrating a checkbox displayed on a workflow application setting screen of the information processing system according to a sixth embodiment for designating (selecting) whether or not to enable forced execution of an application at the time of an error;

FIG. 24 is a diagram illustrating an example of application information of the information processing system according to the sixth embodiment;

Figure 1:
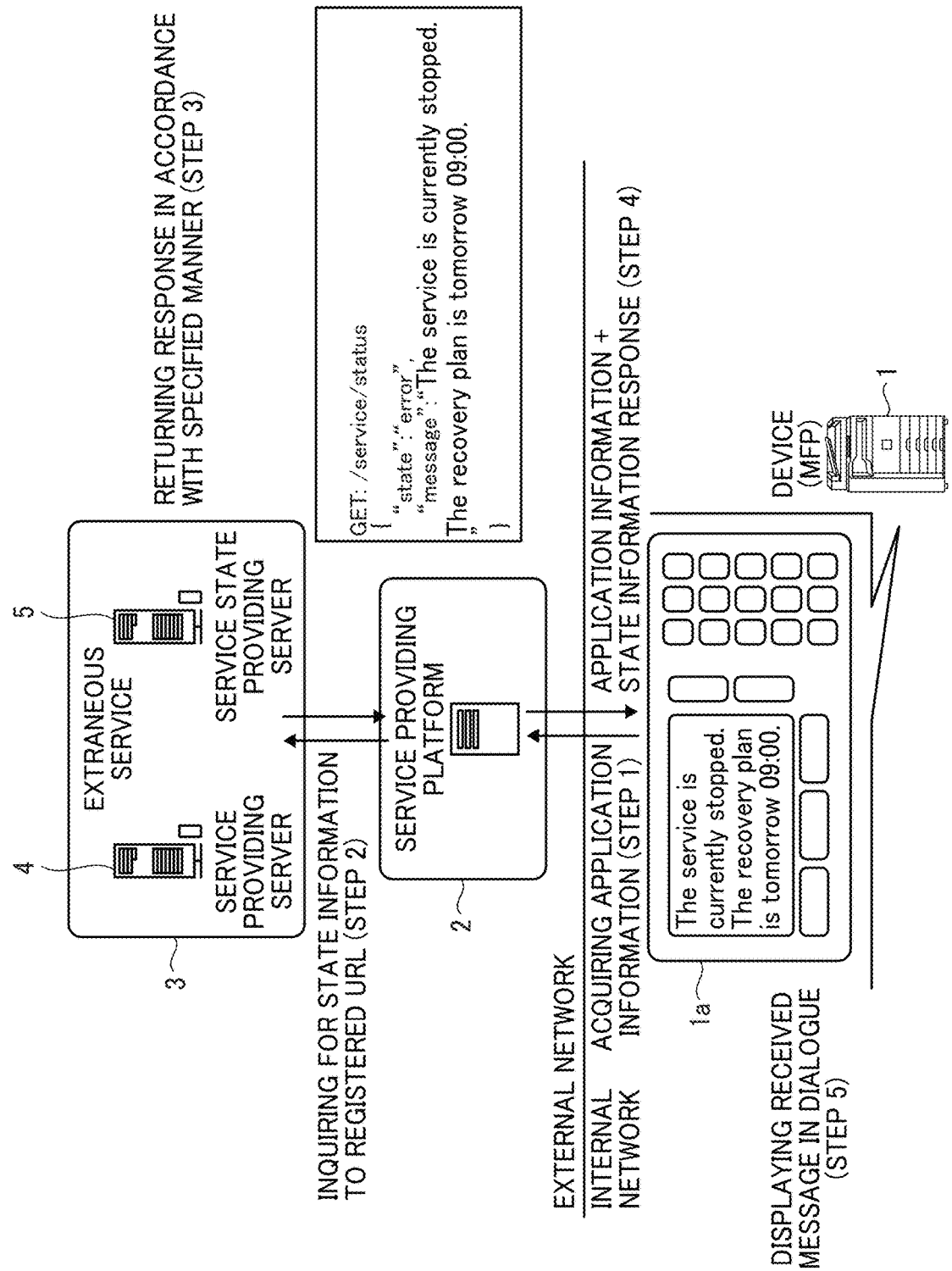
FIG. 1 is a schematic diagram for explaining an outline of an operation of an information processing system according to embodiments.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

FIG. 1 is a schematic diagram for explaining the outline of an operation of an information processing system according to embodiments. The information processing system according to the embodiments includes a device 1, a service providing platform 2, and an extraneous service 3.

The device 1 is an example of an information processing apparatus. For example, the device 1 is connected to an internal network such as a local area network (LAN) and is connected to the service providing platform 2 via an external network such as the Internet. The service providing platform 2 is an example of a management server. The extraneous service 3 includes a service providing server 4 and a service state providing server 5. The service providing server 4 provides a predetermined workflow service. The service state providing server 5 provides a service state of the service providing server 4 to the user via the device 1.

In this disclosure, any one of the service providing platform 2, service providing server 4, and service state providing server 5 are implemented by the general-purpose computer that operates as a server, which includes one or more processors (CPU), one or more memories, and a communication device such as a network interface circuit.

The device 1 may be the information processing apparatus, which may be implemented by the general-purpose computer. In this example, the device 1 is implemented by any known image forming apparatus such as an MFP.

In the information processing system according to the embodiments, in response to receiving an acquisition request for application information from the device 1 (step S1), the service providing platform 2 sends an inquiry for the state of the service providing server 4 to a uniform resource locator (URL) of the service state providing server 5, which is preliminarily registered in the application information, for which the acquisition request has been provided, as the inquiry destination for the state of the service providing server 4 (step S2).

In response to the inquiry for the state, the service state providing server 5 sends a response that indicates the state of the service providing server 4 (step S3). In the example of the response in FIG. 1, an error message such as "The service is currently stopped. The recovery plan is tomorrow 09:00." is provided since the service providing server 4 is currently stopped (server down=error). Such a state information response as indicated by the example of the response is transmitted to the device 1 together with the application information for which the acquisition request has been provided. The device 1 displays the state information response on a display 1a.

In the above-described information processing system, the service state providing server 5 is provided as a predetermined application program interface (API) in the extraneous service 3 on the external network. Accordingly, state information of the service providing server 4, which provides a workflow service, or the like, can be acquired from the service providing server 4 in a predetermined manner, so as to notify the state information to the device 1, as needed.

As the service state providing server 5 that is a predetermined API is included in the extraneous service 3, it is possible to make calling from the service providing platform 2 common such that the extraneous service can be applicable to a variety of usage purposes (it is possible to improve versatility). Further, it is possible for the service providing platform 2 to recognize the usage purpose, such as for printing or for scanning, before executing a workflow. Therefore, by acquiring state information of the service providing server 4 before executing a workflow, it is possible that whether the workflow is in an executable state or not is notified to the user before executing the workflow.

Hereinafter, a detail description is given of the information processing system according to a first embodiment referring to the accompanying drawings.

System Configuration

Figure 2:
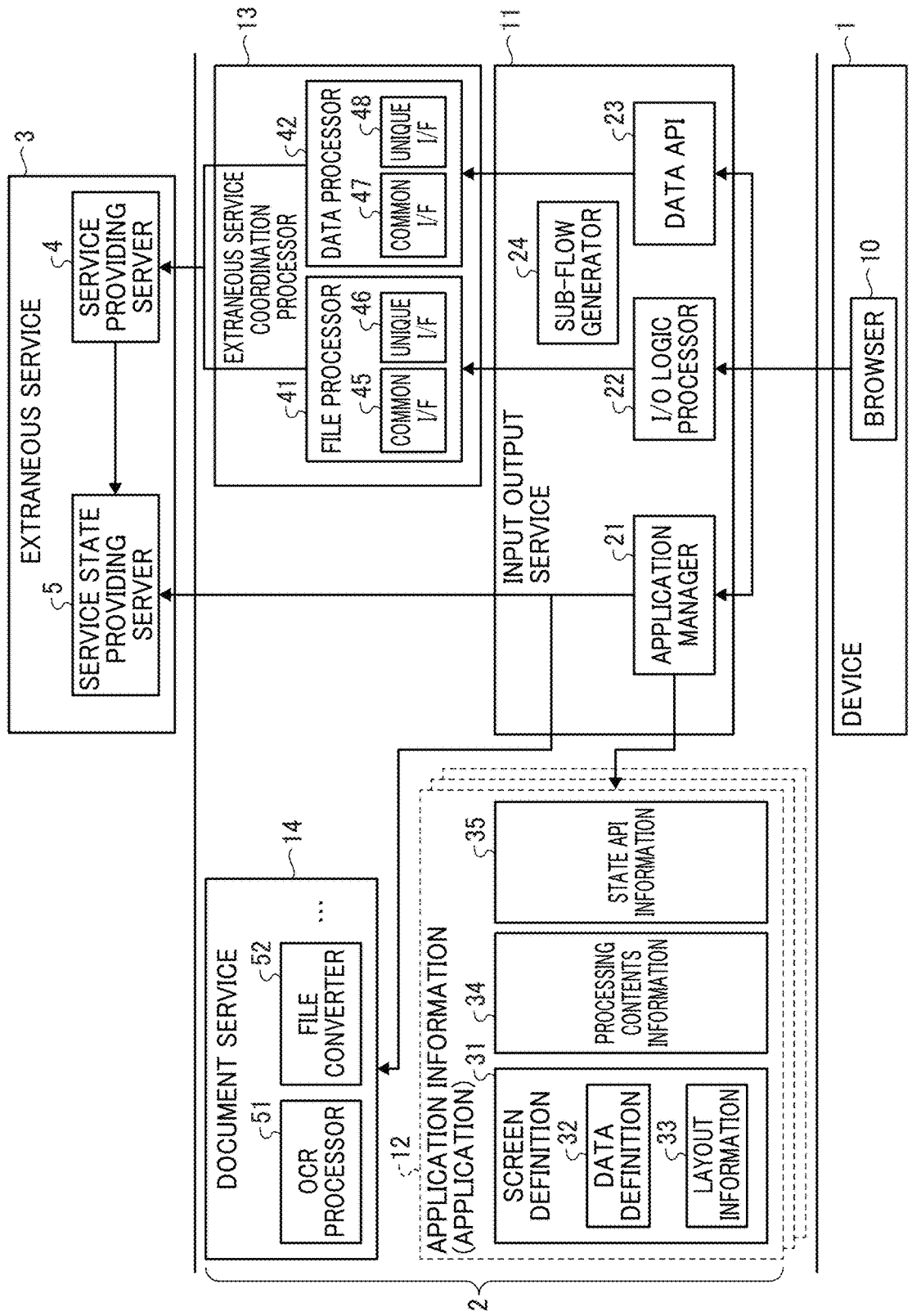
FIG. 2 is a schematic diagram illustrating a configuration of the information processing system according to a first embodiment.

FIG. 2 is a diagram illustrating a configuration of the information processing system according to the first embodiment. As illustrated in FIG. 2, the information processing system according to the first embodiment includes a device 1, a service providing platform 2, and an extraneous service 3.

The device 1 is, for example, a client terminal that utilizes the information processing system. The device 1 is installed with a world wide web (Web) browser (browser) 10. As the device 1, for example, an image forming apparatus such as a multi-function peripheral (MFP), a copier, a printer, or a scanner can be used.

The extraneous service 3 includes a service providing server 4, which provides a predetermined service such as a cloud storage service, and a service state providing server 5, which has a common interface definition. The service state providing server 5 is capable of operating independently without being affected by the operation status of the service providing server 4.

The service providing platform 2 includes an input output service 11, application information (an application program: an example of application information) 12, an extraneous service coordination processor (hereinafter simply referred to as a "coordination processor") 13, and a document service 14.

The input output service 11 includes an application manager 21, an input/output (I/O) logic processor 22, a data API 23, and a sub-flow generator 24. The application manager server 21 manages such as a screen definition and processing contents of application information 12 in association with an identification number (ID) for each application information. The I/O logic processor 22 executes processing of the document service 14 or the coordination processor 13, based on "processing contents" of application information 12. The data API 23 acquires information such as a list of folders or a list of files of the extraneous service 3 via the data processor 42 of the coordination processor 13.

Application information 12 includes a screen definition 31, processing contents information 34, and state API information 35. The screen definition 31 includes a data definition 32 of data to be displayed on a display of the device 1 used by the user and layout information 33 thereof. As processing contents, for example, information indicating a processing manner of the document service 14 or the coordination processor 13 is described.

The coordination processor 13 includes a file processor 41 and a data processor 42. The file processor 41 includes a common interface (common I/F) 45 and a unique I/F 46. Furthermore, the data processor 42 also includes a common interface (common I/F) 47 and a unique I/F 48. The file processor 41 performs processing related to inputting and outputting files to the extraneous service 3. The data processor 42 performs processing such as acquiring and writing data. The coordination processor 13 as described above is prepared for each extraneous service. Therefore, by increasing the number of coordination processors 13, it is possible to increase coordination subjects.

The document service 14 is a group of services for processing documents. The document service 14 includes an optical character recognition (OCR) processor 51, which performs an OCR processing, and a file converter 52, which performs, for example, format conversion of a file and size conversion of an image, etc.

Configuration of Application Information

As described above, the application information 12 is provided with the screen definition 31 including the data definition 32 and the layout information 33. The data definition 32 includes "data ID", "handling data name (key): to be a parameter for processing", and "expression format" and is expressed as an array having the said combination. The type is an element configuring a screen and is the same as a hyper text markup language (HTML) form element, such as "input_text", "textarea", "select", or "radio". Furthermore, as the data source, a uniform resource locator (URL) that holds data is designated. In a case of being fixed, the data can be directly described.

In FIG. 3, an example of the data definition 32 is illustrated. In the example in FIG. 3,
data_id: "1",
data_key: "storage_filename",
format: "input_text", and
data_source: "null (blank)"
are described.

Furthermore, as another example of the data definition 32 illustrated in FIG. 3,
data_id: "2",
data_key: "storage_targetfolder",
format: "select", and
data_source: "http://sample.AAA.xxx/service-a/folders"
are described.

Next, the layout information 33 of the screen definition 31 of the application information 12 includes the data ID of the data definition 32 and positional information (layout) for displaying the data. The layout information 33 includes as a combination, a "data ID", a "display name" and "positional information". As the positional information, coordinates may be used, or the order may be designated from the top. Furthermore, in a case where the device 1 side is not a Web browser 10 but a client application or in a case where a complicated screen is to be configured, the layout information may not exist and the data definition 32 may be interpreted on the device 1 side or in a user interface (UI) generation process.

In FIG. 4, an example of the layout information 33 is illustrated. In the example in FIG. 4,
data_id: "1",
display_name: "FILE NAME", and
layout
order: "1"
are described.

Furthermore, as another example of the layout information 33 illustrated in FIG. 4,
data_id: "2",
display_name: "DELIVERY DESTINATION", and
layout
order: "2"
are described.

Next, as the processing contents information 34 of the application information 12, the usage order of various coordination processors 13 or document services is described. Processing includes a "component name", a "process" and an "option parameter". For example, processing contents information 34 indicating "sending a file to a folder, samplefolder, of storage service A with a file name, test.pdf" is described in such a way as "storage: send_to_folder?type=service-a&targetfolder=samplefolder&filename-test.pdf".

The order of processing is described as follows: Start: input of a file
1: OCR
2: Service A: delivery
Specifically, as illustrated in the example in FIG. 5,
From: "file: input"
to: "process: ocr"
to: "storage: send_to_folder?type=service-a & target=samplefolder"
are described in this order.

Configuration of Coordination Processor

Next, description is given of the configuration of the coordination processor 13. The coordination processor 13 includes the file processor 41 that performs processing related to files such as transmitting a file and acquiring a file for the extraneous service 3. In addition, the coordination processor 13 includes the data processor 42 that performs data processing that can be expressed by texts other than files, such as acquiring a list of folders, for the extraneous service 3.

The file processor 41 includes the common I/F 45 and the unique I/F 46, and the data processor 42 also includes the common I/F 47 and the unique I/F 48. By separating the I/Fs in this way, for example, in a case of implementing applications capable of delivering a file to various coordinated services, all of the applications can be implemented in the same manner by utilizing the common I/F 45 and the common I/F 47 of the file processor 41 and the data processor 42. Furthermore, in a case of creating an application specific to a coordinated service, which utilizes a wide range of the functions of the specific coordinated service, it is possible to implement the application by utilizing the unique I/F 46 and the unique I/F 48 only.

That is, the common I/F 45 of the file processor 41 and the common I/F 47 of the data processor 42 can be commonly used for services dealing with files. For example, it is possible to utilize the common I/F 45 of the file processor 41 for processing such as "transmitting a file to a folder" or "acquiring a file". Furthermore, it is possible to utilize the common I/F 47 of the data processor 42 for processing such as "acquiring a list of files" and "acquiring a list of folders".

The unique I/F 46 of the file processor 41 and the unique I/F 48 of the data processor 42 are utilized for processing of a function of a coordinated service, which is not common for services dealing with files. That is, the unique I/F 46 of the file processor 41 is utilized for processing such as "adding a file to a stored document". Furthermore, the unique I/F 48 of the data processor 42 is utilized for, for example, "acquiring information of a list of clients" or "acquiring information of a list of image files".

In the case of the common I/F 45 of the file processor 41, description may be "/service-a/process/file", or the like, as illustrated in FIG. 6. In the case of the unique IF 46, description "/service-a/process/extension/attach" is additionally described below "/extension".

In the case of the common I/F 47 of the data processor 42, description may be "/service-a/data/files" or "/service-a/data/folders", as illustrated in FIG. 7. In the case of the unique I/F 48 of the data processor 42, description "/service-a/data/extension/images" is additionally described below "/extension".

System Operation

Next, description is given of system operation of the information processing system according to the first embodiment. FIG. 8 is a diagram illustrating how an OCR service is provided by the service providing server 4 of the extraneous service 3 and the OCR processor 51 of the document service 14 in the information processing system according to the first embodiment. In FIG. 8, the application manager 21 of the input output service 11 acquires application information 12, for which an acquisition request has been sent from the device 1, and accesses the service state providing server 5 of the extraneous service 3, based on a URL indicated by the state API information 35 of the application information 12. Then, the application manager 21 provides the service state providing server 5 with an acquisition request for state information indicating the current state of the service providing server 4.

In response to the acquisition request, the service state providing server 5 generates the state information indicating the current state of the service providing server 4 and transmits the state information to the application manager 21 of the input output service 11. The application manager 21 determines whether it is possible for the service providing server 4 to provide a service or not, based on the state information received from the service state providing server 5. In a case where it is determined that it is possible to provide the service, the application manager 21 provides a request for providing a service to the document service 14. Accordingly, a service designated via the device is provided by use of the document service 14 and the service providing server 4 of the extraneous service 3. That is, in this example, an OCR service for generating text data of texts from an image read by the device 1 is provided by the OCR processor 51 and the service providing server 4.

On the other hand, based on the state information, in a case where it is determined that provision of a service is not possible since, for example, the service providing server 4 is in a stopped state, the application manager 21 transmits an error message (state information response) such as "The service is currently stopped. The recovery plan is tomorrow 09:00." to the device 1 together with the application information for which an acquisition request has been provided. The device 1 displays the state information response on the display 1a. Displaying the state information response is an example of a notification. An audio notification, or the like, may be used in alternative to or in addition to the notification by display.

In the above-described information processing system, a service state providing server 5 is provided as a predetermined application program interface (API) in an extraneous service 3 on an external network. Accordingly, state information of a service providing server 4, which provides a workflow service, or the like, can be acquired from the service providing server 4 in a predetermined manner, so as to notify the state information to the device 1, as needed.

Operation of Displaying Error Message

Figure 9:
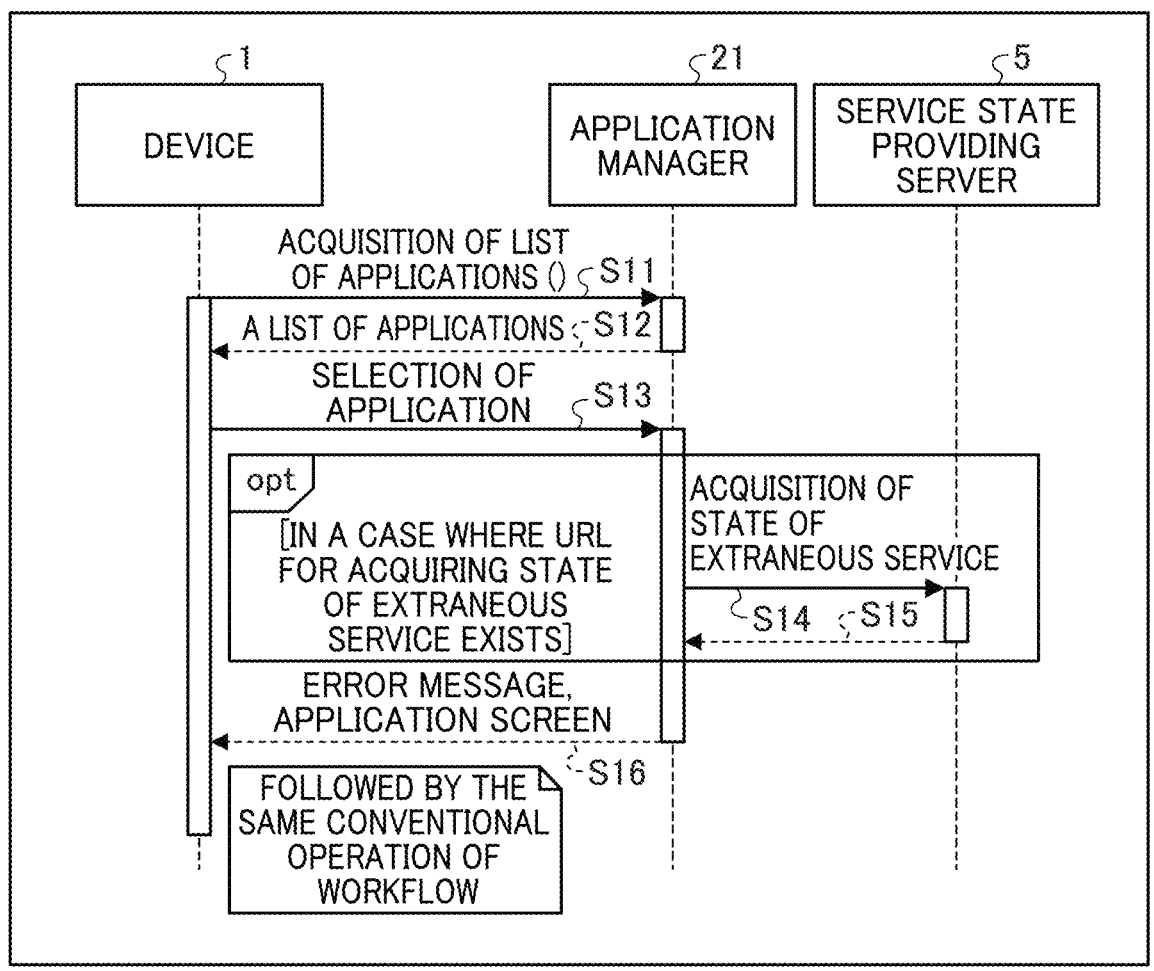
FIG. 9 is a sequence diagram illustrating a flow of an operation of displaying an error message.

FIG. 9 is a sequence diagram illustrating a flow of an operation of displaying such an error message.

In FIG. 9, first, the device 1 sends, to the application manager 21 of the input output service 11, an acquisition request for information about a list of applications (step S11), and receives the information about a list of applications (step S12). The Web browser 10 of the device 1 displays the information about a list of applications acquired from the application manager 21 on the display 1a. The user provides an operation of selecting an application as desired from among the list of applications displayed on the display 1a (step S13).

The application manager 21 acquires the screen definition 31 and the state API information 35 of the application information 12 of the application selected by the user. Further, in a case where there is any notification in the extraneous service 3, the application manager 21 acquires the notification message.

Next, the application manager 21 determines whether or not a URL of the service state providing server 5 of the extraneous service 3 (URL for acquiring state information of the extraneous service) is included as the state API information 35, which is acquired from the application information 12.

Here, description is given of how a URL of a service state providing server 5 is input for application information 12. In FIG. 10, an example of a setting screen of a workflow application is illustrated. The setting screen of the workflow application includes, for example, an input field of the type of the workflow such as "SCAN to FLOW", an input field of a language available such as English or Japanese, and an input field of a display name such as "nanana05". Furthermore, the setting screen of the workflow application includes a field for selecting whether a user authentication exists or not and an input field of a URL from which a status is acquired.

The administrator, or the like, of the information processing system according to the first embodiment inputs a URL of the service state providing server 5, which monitors the current state of the service providing server 4, to the input field of the URL from which the status is acquired. Accordingly, the URL of the service state providing server 5 is registered as the state API information 35 of the application information 12. In FIG. 11, an example of the application information 12 is illustrated. Such description "extStatusUrl: https://xxxxx/service/status" as illustrated in FIG. 11 is an example of the URL of the service state providing server 5 input by the administrator, or the like.

Figures 12, 13:
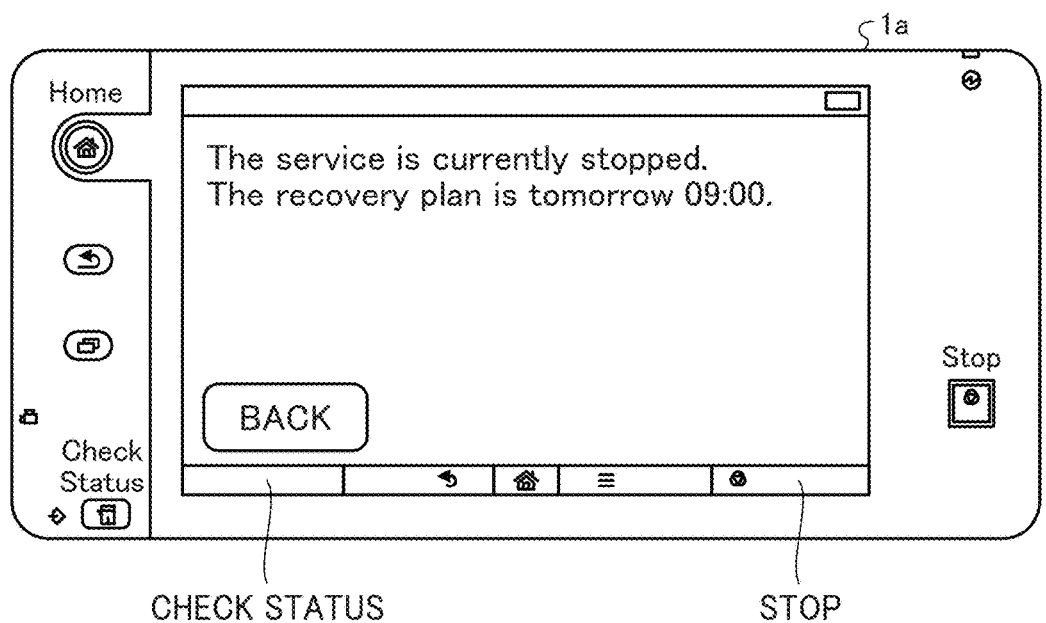
FIG. 12 is a diagram illustrating an example of state information acquired from a service state providing server.
FIG. 13 is a diagram illustrating a display example of an error message acquired from a service state providing server.

In a case where such a URL of a service state providing server 5 is included in the application information 12, the application manager 21 accesses the service state providing server 5, based on the URL (step S14), and acquires state information indicating the current state of the service providing server 4 (step S15). FIG. 12 is a diagram illustrating an example of the state information acquired from the service state providing server 5. In the example in FIG. 12, an error message (state information response) stating "The service is currently stopped. The recovery plan is tomorrow 09:00." is acquired, as the state information.

By acquiring such an error message as described above, it is possible for the application manager 21 to determine that the service providing server 4 is currently in a stopped state and therefore the service is not provided. In this case, the application manager 21 transmits the error message (state information response) such as "The service is currently stopped. The recovery plan is tomorrow 09:00." to the device 1 together with the application information for which the acquisition request has been provided. The device 1 displays the error message acquired from the service state providing server 5 on the display 1a, as illustrated in the example in FIG. 13.

As described above, in the information processing system according to the first embodiment, the extraneous service 3 on the external network includes the service state providing server 5, which is a predetermined API and acquires state information of the service providing server 4. Accordingly, it is possible to acquire state information, which indicates the current state of the service providing server 4, in a predetermined manner from the service providing server 4 that provides a workflow service, or the like, and notify the state information to the device 1, as needed.

Furthermore, as the service state providing server 5 that is a predetermined API is included in the extraneous service 3, it is possible to make calling manners from the service providing platform 2 common, such that the extraneous service 3 can be used in a variety of usage purposes (it is possible to improve versatility).

In addition, it is possible for the service providing platform 2 to recognize the usage purpose, such as for printing or for scanning, before executing a workflow. Therefore, by acquiring state information of the service providing server 4 before executing a workflow, it is possible that whether a workflow is in an executable state or not is notified to the user before executing the workflow.

Next, referring to FIG. 14, description is given of an information processing system according to a second embodiment. In the information processing system according to the second embodiment, the service state providing server 5 of the extraneous service 3 returns a message in a plurality of languages to the application manager 21. In the example in FIG. 14, the service state providing server 5 returns a message in Japanese and in English to the application manager 21. In the example in FIG. 14, the message stating "The service is currently stopped. The recovery plan is tomorrow 09:00." in English and the message stating the same in Japanese are returned to the application manager 21.

The application manager 21 returns to the device 1 a message in a language that is designated by the device 1 as the language to be displayed from among notifications in plurality of languages acquired from the service state providing server 5. For example, the application manager 21 determines a language designated by the device 1 as the language to be displayed, based on a "request Accept-Language header" in hyper text markup language (HTTP), which is added to a request that is transmitted from the Web browser 10 of the device 1. Note that the header may be a particular header or parameter.

In the information processing system according to the second embodiment, it is possible to display a message in a language designated by the device 1. Therefore, the information processing system can be adjusted for usage in languages in the world, and the same effect as the above-described first embodiment can be obtained.

Figure 16:
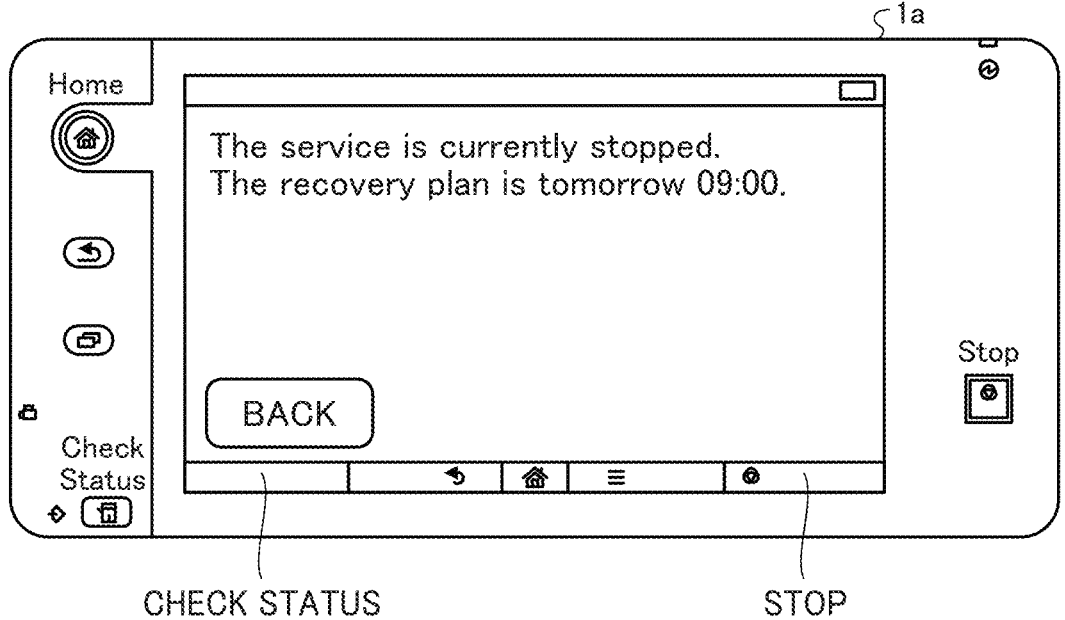
FIG. 16 is a diagram for describing the inconvenience that there is no choice but to return to a display screen of a list of applications by operating a "BACK" button after an error message is displayed.
Figure 17:
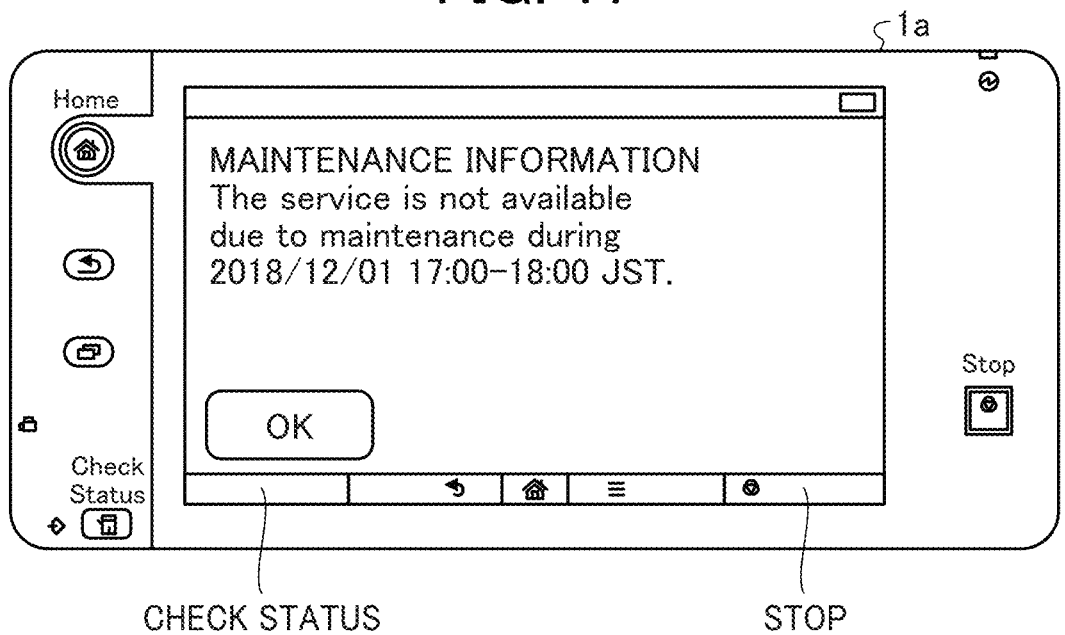
FIG. 17 is a diagram illustrating an example in which an "OK" button is displayed together with a message on a display of a device, according to the third embodiment.

Next, referring to FIGS. 15 to 17, description is given of an information processing system according to a third embodiment. In the third embodiment, status information that indicates the current state of the service providing server 4 is added to the state information of the service providing server 4 together with such a message as described above.

FIG. 15 is an example of state information in the information processing system according to the third embodiment. Status information "state:error" is added on top of the message in Japanese and in English. In the example in FIG. 15, it is indicated that the service providing server 4 is stopped (error).

Here, as illustrated in FIG. 16, consider a case in which a message stating "The service is currently stopped. The recovery plan is tomorrow 09:00." and a "BACK" button, which makes the display screen return to the display screen of one operation before, are displayed on the display 1a of the device 1. In this case, after the error message is displayed, since the user can only return to the display screen of a list of applications by operating the "BACK" button, it is difficult to designate execution of the application.

Therefore, in the information processing system according to the third embodiment, the display 1a of the device 1 is controlled to display an "OK" button together with the message corresponding to the state information of the service providing server 4 acquired by the application manager 21 from the service state providing server 5. FIG. 17 is an example in which an "OK" button is displayed on the display 1a of the device 1 together with a message stating "The service is not available due to maintenance during 2018/12/01 17:00-18:00 JST.", or the like.

The application manager 21 controls execution of the application in accordance with the state of the service providing server 4 as indicated by the message. That is, the application manager 21 makes the application available for use in a case where the user operates the "OK" button. Accordingly, it is possible to notify a variety of statuses other than an error. Furthermore, it is possible to prevent such an inconvenience for the user as executing a job while the service is stopped and it results in an error from happening. In addition, the same effect as each of the above-described embodiments can be obtained.

Next, referring to FIGS. 18 and 19, description is given of an information processing system according to a fourth embodiment. The fourth embodiment illustrates a case where an extraneous service 3 is in error, such that the service providing server 4 is not capable of providing the service using the extraneous service 3. In such case, the application manager 21 temporarily stores a job to be executed in any desired memory. FIG. 18 is a diagram illustrating a list of temporarily stored jobs. As illustrated in the example in FIG. 18, information of a job ID, a status URL, a file URL, a job parameter, and an expire date is temporarily stored for each job. A status URL is a URL of the API for acquiring the state of a service that is a monitoring target. A file URL is a path in which a file transmitted by a job is stored in a temporary storage area inside a service. A parameter is a parameter for executing a job. "expiredate" is an expiration date when a time period for storing data is expired.

FIG. 19 illustrates an example of parameters of a temporarily stored job. As for the parameters of "operation1" in the example in FIG. 19, the service key is "xxxx", the tenant ID is "tenantA", and the user ID is "user1". Furthermore, as for the parameters of "operation2" in the example in FIG. 19, the file name is "file1.pdf" and the folder ID is "root".

By temporarily storing a job, the application manager 21 acquires and monitors from the service providing server 4 the state of the extraneous service 3 corresponding to a temporarily stored job on a regular basis. For a case in which the extraneous service 3 is in error, the user at the device 1 performs operation of selecting either executing a job after the error is resolved or cancelling the job in advance via the device 1, and the selected information is stored in the application manager 21. In a case where the state of the extraneous service 3 returns to the normal state, if executing a job after the error is resolved is selected by the user, the application manager 21 controls execution of the temporarily stored job. Accordingly, it is possible to automatically execute the temporarily stopped job in a case where the state of the extraneous service 3 recovers from the error. As described above in any of the embodiments, the state of the extraneous service 3 is determined based on the state information of the service providing server 4.

Figure 22:
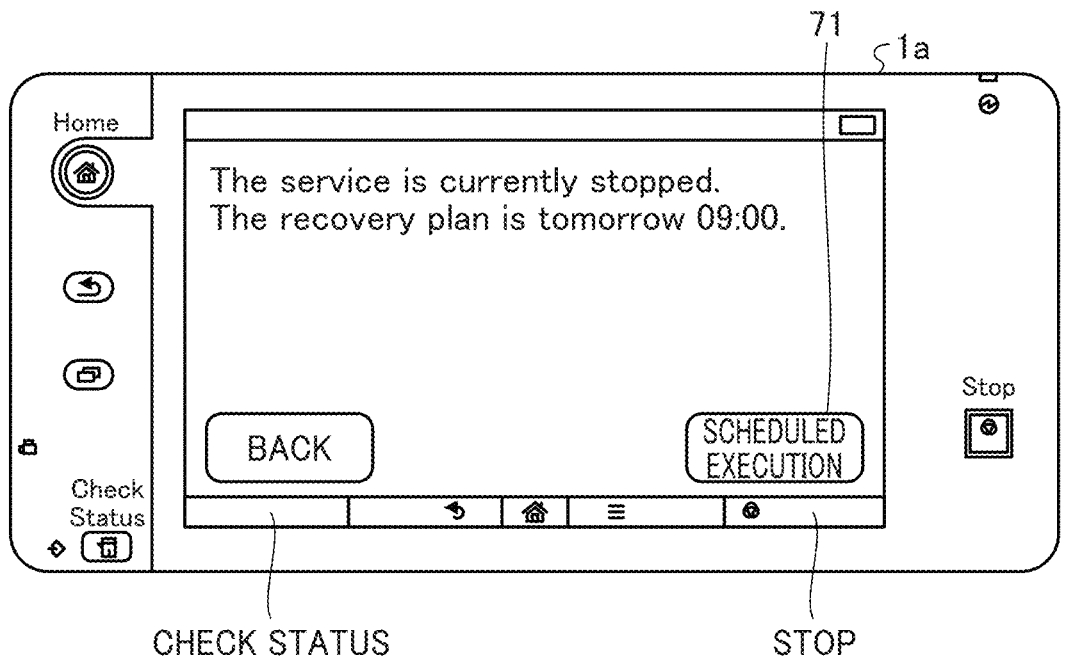
FIG. 22 is a diagram illustrating a scheduled execution designating button displayed on a device of the information processing system according to the fifth embodiment.

Next, referring to FIGS. 20 to 22, description is given of an information processing system according to a fifth embodiment. In the information processing system according to the fifth embodiment, application information 12 includes scheduled execution availability information, which indicates whether scheduled execution is available. In a case where the state of the extraneous service 3 is in error, the application manager 21 executes the application if scheduled execution is enabled according to the scheduled execution availability information of the application information 12.

Specifically, for example, there may be a workflow in which a result changes depending on the execution time, or the like, and a workflow developer desires not to allow scheduled execution. In such a case, it is possible to create a more flexible workflow application by allowing a setting for scheduled execution availability for each workflow application.

That is, in a case of the information processing system according to the fifth embodiment, as illustrated in FIG. 20, a checkbox stating "ENABLE SCHEDULED EXECUTION AT THE TIME OF AN ERROR" for designating (selecting) whether scheduled execution is enabled at the time of an error or not is provided on such a setting screen of a workflow application as explained with reference to FIG. 10. For example, the checkbox is blank by default. The workflow developer, or the like, provides an operation of inputting a check on the checkbox in a case of enabling scheduled execution, and keeps the checkbox blank (the operation of inputting a check is not provided) in a case of not enabling scheduled execution.

In FIG. 21, an example of application information 12 in the information processing system according to the fifth embodiment is illustrated. In a case of the information processing system according to the fifth embodiment, "extStatusUrl: https://xxxxx/service/status,enableScheduleExec: true," is added to the application information 12 as scheduled execution availability information. In the example in FIG. 21, scheduled execution is enabled (true). Note that, in a case where scheduled execution is not enabled, the scheduled execution availability information is "enableScheduleExec: false".

In a case where the state of an extraneous service 3 is an error, the application manager 21 determines whether scheduled execution of the application is enabled or not, based on such scheduled execution availability information of application information 12. In a case where it is determined that scheduled execution is enabled, as illustrated in FIG. 22, the scheduled execution designating button 71 for designating "SCHEDULED EXECUTION" is controlled to display on the display 1a of the device 1 together with such an error message as described above. Then, in a case of detecting an operation to the scheduled execution designating button 71, execution of the corresponding application is controlled.

Since it is possible to set availability of scheduled execution for each workflow application, it is possible to create a more flexible workflow application. In addition, the same effect as each of the above-described embodiments can be obtained.

Figure 25:
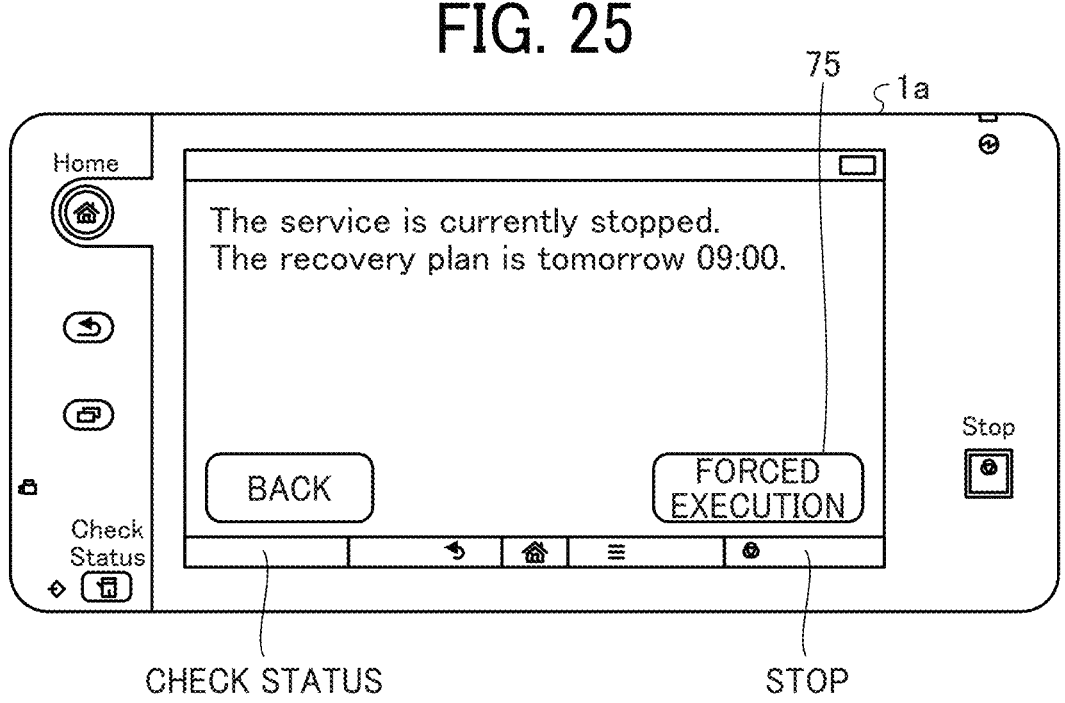
FIG. 25 is a diagram illustrating a forced execution designating button displayed on a device of the information processing system according to the sixth embodiment.

Next, referring to FIGS. 23 to 25, description is given of the information processing system according to a sixth embodiment. In the information processing system according to the sixth embodiment, application information 12 includes forced execution availability information, which indicates availability of forced execution of the application. In a case where the state of the extraneous service 3 is an error, the application manager 21 forcibly executes the application if forced execution is enabled according to the forced execution availability information of the application information 12.

That is, in a case of the information processing system according to the sixth embodiment, as illustrated in FIG. 23, for example, a checkbox stating "ENABLE FORCED EXECUTION AT THE TIME OF AN ERROR" for designating (selecting) whether forced execution is enabled at the time of an error or not is provided on such a setting screen of a workflow application as explained with reference to FIG. 10. For example, the checkbox is blank by default. The workflow developer, or the like, provides an operation of inputting a check on the checkbox in a case of enabling forced execution, and keeps the checkbox blank (the operation of inputting a check is not provided) in a case of not enabling forced execution.

In FIG. 24, an example of application information 12 in the information processing system according to the sixth embodiment is illustrated. In a case of the information processing system according to the sixth embodiment, "extStatusUrl:https://xxxxx/service/status,enableForceExec: true," is added to the application information 12 as forced execution availability information. In the example in FIG. 24, forced execution is enabled (true). Note that, in a case where forced execution is not enabled, the forced execution availability information is "enableForceExec: false".

In a case where the state of an extraneous service 3 is an error, the application manager 21 determines whether forced execution of the application is enabled or not, based on such forced execution availability information of application information 12. In a case where it is determined that forced execution is enabled, as illustrated in FIG. 25, the forced execution designating button 75 for designating "FORCED EXECUTION" is controlled to display on the display 1a of the device 1 together with such an error message as described above. Then, in a case of detecting an operation to the forced execution designating button 75, execution of the corresponding application is controlled.

Since it is possible to set availability of forced execution for each workflow application, it is possible to create a more flexible workflow application. In addition, the same effect as each of the above-described embodiments can be obtained.

Figure 26:
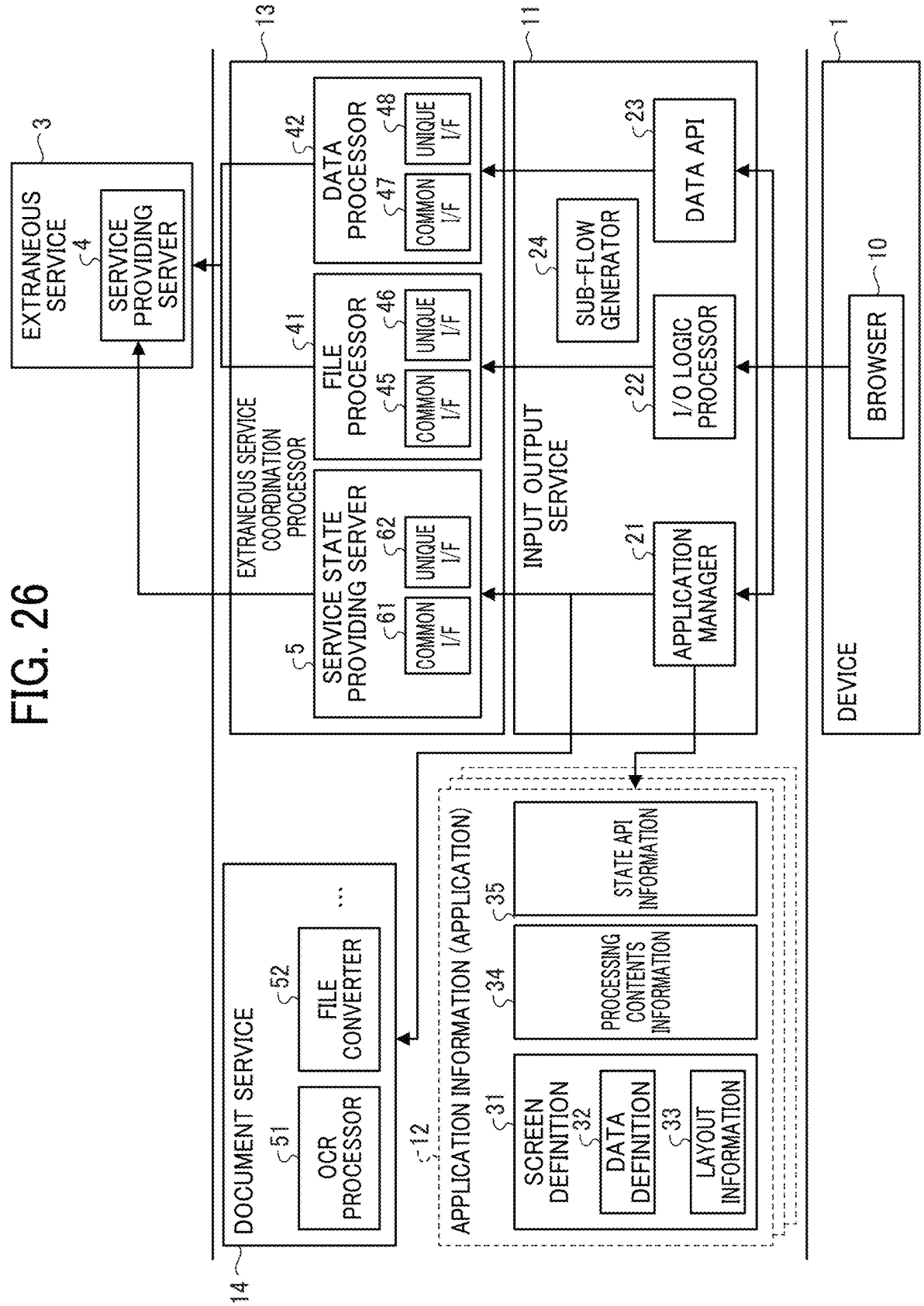
FIG. 26 is a system configuration diagram of the information processing system according to a seventh embodiment.

Next, referring to FIG. 26, description is given of an information processing system according to a seventh embodiment. The information processing system according to the seventh embodiment is an example in which the service state providing server 5, which is provided in the extraneous service 3 in the above description, is provided in the coordination processor 13, as illustrated in FIG. 26. The service state providing server 5 provided in the coordination processor 13 includes the common I/F 61 and the unique I/F 62, as with the file processor 41 and the data processor 42.

As with the above description, the service state providing server 5 provided in the coordination processor 13 detects the current state of the service providing server 4 and notifies the current state of the service providing server 4 to the application manager 21. Accordingly, it is possible to obtain the same effect as described above, such as whether a workflow is in an executable state or not can be notified to the user before executing the workflow.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system for providing a service via a service providing server residing on a first network, the service being requested by an information processing apparatus residing on a second network different from the first network based on application information, the information processing system comprising:
   first circuitry configured to obtain state information indicating a state of the service providing server; and
   second circuitry configured to transmit the state information of the service providing server to the information processing apparatus in response to reception of a workflow service request to the service providing server from the information processing apparatus, to cause the information processing apparatus to perform a notification operation according to the state information that is received before the requested workflow service is executed.

2. The information processing system according to claim 1,
   wherein the first circuitry generates the state information in a plurality of languages and transmits the state information in the plurality of languages to the second circuitry, and
   wherein the second circuitry transmits the state information to the information processing apparatus in a language designated by the information processing apparatus from among the plurality of languages.

3. The information processing system according to claim 1, wherein the state information includes status information that indicates the current state of the service providing server and a message corresponding to the status information.

4. The information processing system according to claim 1,
   wherein the second circuitry temporarily stores in a memory a job to be executed when the state information indicates an error in providing the service, and executes the job temporarily stored when the state information indicates that the error is resolved.

5. The information processing system according to claim 4,
   wherein the second circuitry stores in the memory selection information indicating a user selection of whether to execute the job stored temporarily after the error is resolved or cancel the job, and controls to execute the job stored temporarily when the selection information indicates to execute the job after the error is resolved.

6. The information processing system according to claim 1,
   wherein the application information includes scheduled execution availability information indicating whether or not scheduled execution of an application is enabled when the state information indicates the error, and
   wherein, when the state information indicates the error in providing the service, the second circuitry executes the application for which scheduled execution is enabled according to the scheduled execution availability information.

7. The information processing system according to claim 1,
   wherein the application information includes forced execution availability information indicating whether or not forced execution of an application is enabled when the state information indicates the error in providing the service, and
   wherein, when the state information indicates the error in providing the service, the second circuitry executes the application for which forced execution is enabled according to the forced execution availability information.

8. The information processing system according to claim 1, wherein the first circuitry and the second circuitry are implemented by one or more processors residing on one or more servers.

9. An information processing method comprising:
   receiving a request for a service to be provided by a service providing server residing on a first network, from an information processing apparatus residing on a second network different from the first network based on application information;
   obtaining state information indicating a state of the service providing server; and
   transmitting the state information of the service providing server to the information processing apparatus in response to reception of a workflow service request to the service providing server from the information processing apparatus, to cause the information processing apparatus to perform a notification operation according to the state information before the requested workflow service is executed.

10. A non-transitory recording medium storing a plurality of instructions which, when executed by one or more processors, cause the processors to perform an information processing method comprising:
    receiving a request for a service to be provided by a service providing server residing on a first network, from an information processing apparatus residing on a second network different from the first network based on application information;
    obtaining state information indicating a state of the service providing server; and transmitting the state information of the service providing server to the information processing apparatus in response to reception of a workflow service request to the service providing server from the information processing apparatus, to cause the information processing apparatus to perform a notification operation according to the state information before the requested workflow service is executed.

\* \* \* \* \*